United States Patent
Naito et al.

(10) Patent No.: US 9,422,422 B2
(45) Date of Patent: Aug. 23, 2016

(54) TRANSPARENT AND TOUGH RUBBER COMPOSITION AND MANUFACTURING PROCESS FOR THE SAME

(71) Applicant: KRATON POLYMERS U.S. LLC, Houston, TX (US)

(72) Inventors: Fumio Naito, Ibaraki (JP); Yoshikatsu Nakazawa, Ibaraki (JP)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/769,691

(22) PCT Filed: Jan. 27, 2014

(86) PCT No.: PCT/JP2014/051659
§ 371 (c)(1),
(2) Date: Aug. 21, 2015

(87) PCT Pub. No.: WO2014/132718
PCT Pub. Date: Sep. 4, 2014

(65) Prior Publication Data
US 2016/0009907 A1    Jan. 14, 2016

(30) Foreign Application Priority Data
Feb. 28, 2013    (JP) .................. 2013-040121

(51) Int. Cl.
| B60C 1/00 | (2006.01) |
| C08K 5/00 | (2006.01) |
| B01F 17/00 | (2006.01) |
| C08L 9/00 | (2006.01) |
| C08L 7/00 | (2006.01) |
| C08L 23/02 | (2006.01) |

(52) U.S. Cl.
CPC ... C08L 9/00 (2013.01); C08L 7/00 (2013.01); C08L 23/02 (2013.01); *C08L 2205/02* (2013.01); *C08L 2205/025* (2013.01); *C08L 2312/00* (2013.01)

(58) Field of Classification Search
CPC ............ C08L 9/00; C08L 7/00; C08L 23/02; C08L 21/00; C08L 2205/025; C08L 2312/00; C08L 2205/02
USPC .................. 524/526, 528, 191, 236
See application file for complete search history.

(56) References Cited

U.S. PATENT DOCUMENTS

RE27,145 E      6/1971  Jones
5,340,112 A *   8/1994  Hamada ............. A63B 37/0003
                                             260/998.14

FOREIGN PATENT DOCUMENTS

| JP | H10155939 A | 6/1986 |
| JP | H026544 A | 1/1990 |
| JP | H5179063 A | 7/1993 |
| JP | 2002327092 A | 11/2002 |
| JP | 2002363344 A | 12/2002 |
| JP | 2003041060 A | 2/2003 |
| JP | 2003147138 A | 5/2003 |
| JP | 2003301080 A | 10/2003 |
| JP | 2005002225 A | 1/2005 |
| JP | 2005200608 A | 7/2005 |
| JP | 2013040121 A | 2/2013 |
| JP | 2013505445 A | 2/2013 |

* cited by examiner

*Primary Examiner* — William Cheung
(74) *Attorney, Agent, or Firm* — Conley Rose, P.C.; Leslie Streeter

(57) ABSTRACT

In order to provide a rubber composition having high transparency and toughness, the present invention can provide a crosslinked rubber composition, being substantially free of silica, comprising a first olefin polymer having refractive index of between 1.500 to 1.525 at 23 degree C.; and a second olefin polymer which is different from the first olefin polymer, wherein the composition has haze of 20% or less on 2 mm thick sheet, measured according to JIS K7136, and wherein the composition has Type A Durometer hardness (0 sec) of 35 or more, measured according to JIS K6253.

20 Claims, No Drawings

TRANSPARENT AND TOUGH RUBBER COMPOSITION AND MANUFACTURING PROCESS FOR THE SAME

This patent application is a U.S. national stage application under 35 U.S.C. Section 371 of International Patent Application No. PCT/JP2014/051659 filed on Jan. 27, 2014, which claims the benefit of foreign priority to Japanese Patent Application No. JP 2013-040121 filed on Feb. 28, 2013, the entire disclosures of which are hereby incorporated herein by reference.

TECHNICAL FIELD

The present invention relates to a transparent rubber composition and a manufacturing process of the composition. The present invention also relates to an article including the rubber composition.

BACKGROUND

A transparent material is a material through which visible light passes. A transparent material has a unique benefit that you can see through the material. A material cannot acquire transparency a posteriori by coloring. An a priori transparent material has been studied and developed in various industrial and artistic fields.

Since a transparent material can be applied in a wide range of uses, the transparent material has been required to have any of various properties as well as an opaque material. The conventional transparent or semi-transparent materials however fail to meet a requirement for strength or toughness on an article such as shoes and tires in practice.

In addition, a so-called transparent material may actually have various transparency. In the case that a material is muddy or hazy, the material would be unsuitable for preparing a transparent and aesthetic material.

Patent Literature 1 discloses a transparent crosslinked rubber composition comprising ethylene/alpha-olefin/non-conjugated polyene copolymer rubber, ethylene/polar monomer copolymer, and silica.

Adding silica for strength of a material, however, has been known to impair the transparency of the material. A silica-containing material is sometimes called as transparent material, but indeed the material is clouded or yellowed. In addition, a silica-containing material requires a complicated process to disperse silica in order to improve its transparency.

A silicon-based material such as silicone resin and silica-containing resin generally needs oil as a softener to have flexibility. The more flexibility a silicon-based material has, the more oil is needed. Oil in a silicon-based material however leads to a "bleeding" over time, and its use has been actually restricted.

Patent Literature 2 discloses a transparent composition comprising a rubber polymer containing two components having different refractive indices, and wet silica. Indeed the composition has an insufficient transparency, and cannot overcome the defects of conventional art. The prior composition also has the defects of silica.

Patent Literatures 3 to 5 disclose crosslinked polybutadiene compositions. The conventional compositions are mere good in coloration, and cannot contribute to transparency.

Even though there has been many prior studies and demands in the filed, the skilled artisan has not developed yet a composition having both high transparency and rubber properties such as hardness and strength. The fact is an evidence of great difficulties to achieve the combination of the properties at higher level.

CITATION LIST

Patent Literature

Patent Document 1: Japanese laid-open patent application No. 2003-301080
Patent Document 2: Japanese laid-open patent application No. 2005-002225
Patent Document 3: Japanese laid-open patent application No. 2002-327092
Patent Document 4: Japanese laid-open patent application No. 2002-363344
Patent Document 5: Japanese laid-open patent application No. 2003-041060

SUMMARY OF INVENTION

Technical Problem

In view of the aforementioned defects of the conventional art, the present invention now provides a rubber composition having both excellent transparency and strength and a manufacturing process thereof, and then meets the needs raised from market users.

Solution to Problem

An embodiment of the present invention provides a crosslinked rubber composition, being substantially free of silica, comprising:
  a first olefin polymer having refractive index of between 1.500 to 1.525 at 23 degree C.; and
  a second olefin polymer which is different from the first olefin polymer,
  wherein the composition has haze of 20% or less on 2 mm thick sheet, measured according to JIS K7136, and
  wherein the composition has Type A Durometer hardness (0 sec) of 35 or more, measured according to JIS K6253.

Another embodiment of the present invention provides a transparent, crosslinked rubber composition, comprising:
  low-cis isoprene rubber (IR); and
  a rubber polymer component selected from the group consisting of butadiene rubber (BR), 1,2-polybutadiene rubber, styrene butadiene rubber (SBR), acrylonitrile butadiene rubber (NBR), hydrogenated nitrile rubber (HNBR), urethane rubber (U), ethylene-propylene rubber (EPM), ethylene-propylene-diene rubber (EPDM), and natural rubber (NR),
  wherein the amount of the low-cis isoprene rubber is from 45 to 95 mass parts, with the proviso that the total amount of the low-cis isoprene rubber and the rubber polymer component is 100 mass parts, and
  wherein the composition is substantially free of silica.

Still another embodiment of the present invention provides a process for manufacturing a transparent, crosslinked rubber composition, being substantially free of silica, the process comprising the acts of:
  providing a first olefin polymer prepared by a lithium catalyst, the first olefin polymer having refractive index of between 1.500 to 1.525 at 23 degree C.;
  providing a second olefin polymer prepared by a lithium catalyst, the second olefin polymer being different from the first olefin polymer;

mixing the first and second olefin polymers to obtain a mixture thereof; adding a crosslinker to the mixture; and uniformly kneading the mixture.

Advantageous Effects of Invention

The present rubber composition can solve the defects of conventional compositions, and can have excellent transparency and strength.

Description of Embodiments

Embodiments of the present invention will be explained in detail, but the present invention is not limited to the embodiments.

DEFINITIONS

The term of "transparent" means that a transmitted light passed through an article is mainly comprised of specular transmission, where the ratio of specular-transmitted visible light is large. The degree of transparency is determined, in the present application, from value of haze or total luminous transmittance. An article which lacks "transparency" defined above, can be called as "opaque" or "semi-transparent".

The term of "haze" means the degree of dimness in a transparent material, measured according to JIS K7163 (or ISO 14782). The value of haze is determined as a percent of transmitted light which strays from the incident light in the angle of 0.044 rad or more by forward scattering.

The term of "TT" which stands for "total luminous transmittance" means the ratio of light beam passed through a transparent material, measured according to JIS K7361-1 (or ISO 13468-1). The value of total luminous transmittance is determined as the ratio of total transmitting light flux with respect to parallel incident light flux on a test article.

The term of "Type A Durometer Hardness" or "Hs" means the hardness of a rubber composition measured according to JIS K6253. The value of Hs is determined, in the present specification, from the following procedure: constantly pushing a plunger onto a test article, and measuring the depth of the pushed plunger in the article at 0 sec or 30 sec after the pushing.

The term of "tear strength" means the tear strength of a rubber composition measured according to JIS K6252. The value of tear strength is determined, in the present specification, by using 2 mm-thick sheet of a test material, and converted in N/mm unit.

The term of "Mooney viscosity" means the viscosity of a unvulcanized rubber measured according to JIS K6300-1. The value of Mooney viscosity is measured, in the present specification, by a Mooney viscometer fitting the standard in JIS K6300-1.

The term of "vinyl content" refers to the amount of a conjugated diene which is polymerized via 1,2-addition (in the case of butadiene-it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The vinyl content is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

The terms of "plasticizer oil", "plasticizer", and "softener" mean a (oil-based) compound known as an additive for changing properties of a material in the art. The plasticizer may include, but not limited to, paraffin oil, mineral oil, ester oil, hydrocarbon-based synthetic lubricating oils, naphthenic oils, and vegetable oils.

As used herein, unless otherwise noted, the term "molecular weight(s)" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

The words of "comprising", "including", and "containing" mean in the present specification, unless otherwise noted, that an article or component connotes or has an element(s). The spirit of the words may embraces both an internal and external additions.

In the case that the word of "about", "around", or "appropriately" is prefixed to a value, in the present specification, the value can include a tolerance of at least plus/minus 10 percent.

Olefin Polymers

Olefin polymers mean a polymerized olefin(s), and include diene polymers and non-diene polymers. The olefin polymer may also include thermoplastic elastomers (TPEs). The composition according to the present embodiments may include at least two olefin polymers.

The term of "polymer" in the present specification can include, unless otherwise noted, both a vulcanized polymer and a non-vulcanized polymer.

The olefin polymer may include a conjugated olefin polymer and a non-conjugated olefin polymer. The term of "conjugated olefin polymer" means a polymer of olefin(s) having double bonds set apart from each other byseparted by generally at least two single bonds.

The olefin polymer may be prepared, but not limited to, from C4 to C20 olefin (including diolefin and alpha-olefin), preferably C4 to C12 olefin, more preferably C4 to C8 olefin.

The conjugated and non-conjugated olefin may include, but not limited to, 1,2-butadiene, 1,3-butadiene, 2-methyl-1, 3-butadiene (i.e., isoprene), 2,3-dimethyl-1,3-butadiene, 1,3-pentadiene, 4-methyl-1-pentene, 1,3-hexadiene, 1,4-hexadiene, 1,3-heptadiene, 4,6-dimethyl-1-heptene, 1,3-octadiene, 1,7-octadiene, 1,3-nonadiene, 1,3-decadiene, 1,9-decadiene, 1,3-dodecadiene, cyclopentene, cyclohexene, cyclooctene, dicyclopentadiene, norbornene, 5-ethylidene-2-norbornene, 5-vinylidene-2-norbornene, and 5-methylene-2-norbornene. The olefin polymer can have any number average molecular weight, but may have 100 g/mol to 100,000 g/mol of number average molecular weight, for instance.

The olefin polymer may also include vinyl aromatic hydrocarbons such as styrene, o-methylstyrene, p-methylstyrene, p-tert-butylstyrene, 2,4-dimethylstyrene, alpha-methylstyrene, vinyl naphthalene, vinyl toluene, vinyl xylene, and mixtures thereof.

The term of "diene polymer" means a kind of olefin polymers. A diene polymer is made from a polymerization of hydrocarbon having two double bonds. The diene polymer may include, but not limited to, isoprene rubber (IR), butadiene rubber (BR), 1,2-polybutadiene rubber (or 1,2-polybutadiene elastomer), styrene-butadiene rubber (SBR), acrylonitrile butadiene rubber (NBR), hydrogenated nitrile rubber (HNBR), chloroprene rubber (CR), and any grade of natural rubber (NR), and may further include any polymers prepared from any diene hydrocarbons known in the art. In the present specification, a polymer which is a rubber may be referred as to "rubber polymer".

The diene polymer may include, of course, conjugated and non-conjugated diene polymers. The conjugated diene polymer may include, but not limited to, ethylene/alpha-olefin copolymers, ethylene/styrene copolymers, and ethylene/conjugated diene copolymers. The non-conjugated diene polymer may include ethylene/non-conjugated diene copolymers. The term of "non-diene polymer" means a polymer in which its unit lacks two double bonds. The non-diene polymer may include, but not limited to, butyl rubber (IIR), fluorine rubber (FKM), ethylene-propylene rubber (EPM), ethylene-propylene-diene rubber (EPDM), and urethane rubber (U), and may further include any polymers prepared from any hydrocarbons known in the art.

Even though the non-diene polymer lexically includes silicone rubber (Q), the silicone rubber would lead to the issue illustrated in the Background section above. Note that, however, the present embodiments do not absolutely exclude a trace of silicone rubber or silica which has little impact on properties of the whole composition. In other words, the phrase of "being substantially free of silica" does not exclude non-substantial use of silica (e.g., those inevitably incorporated in a composition during a manufacturing process).

The diene or non-diene polymers may have some geometrical isomers. The cis content (ratio) of the isomers may affect the properties. The cis content may be measured by the IR spectroscopy according to JIS 6230 or ISO 4650.

The degree of cis content depends on a kind of polymer. For instance, in the case of polyisoprene, "low-cis" diene polymer may have from about 90% to about 95% of cis content, more typically from about 90% to about 94% of cis content, and more further typically from about 90% to about 92% of cis content; and "high-cis" diene polymer may have more than about 95% of cis content, more typically from about 98% to about 99% of cis content.

In the case of polybutadiene, "low-cis" rubber may have from about 20% to about 40% of cis content; "high-cis" rubber may have from about 94% to about 98% of cis content; and "modest-cis" rubber may have an intermediate cis content.

The present embodiments may preferably use at least one low-cis or modest-cis diene polymer to obtain higher transparency or appropriate hardness.

The low-cis or modest-cis diene polymer may include, for instance, Cariflex IR0307KU and Cariflex IR0310KU (polyisoprene manufactured by Kraton Polymers, cis content: about 90% to about 91%); Solprene 255 and Asaprene 755A (styrenic elastomer manufactured by Asahi Kasei); Diene 35NR, Diene 35RNF, Diene 55RNF, Diene 35NF, Diene 55NF, and Diene 51 (modest-cis polybutadiene manufactured by Firestone Polymers, cis content: about 40%, Mooney viscosity: about 35 to about 55); Nipol BR1241S and Nipol BR1242S (low-cis 1,4-polybutadiene manufactured by ZEON, Mooney viscosity: about 35 to about 55); and JSR RB805, JSR RB810, JSR RB820, JSR RB830, and JSR RB840 (low crystalline syndiotactic 1,2-polybutadiene-based thermoplastic elastomer manufactured by JSR, 1,2-bond content: about 90% to about 96%)

The polymer may preferably have low crystallizability to obtain an adequate flexibility. In the case of polybutadiene block copolymer, the ratio of 1,2-addition may preferably be about 30% or more to avoid crystallization after hydrogenation, in particular to avoid too much hardness at lower temperature.

The polymer above may be prepared by using any conventional inert hydrocarbon solvents that have been known to be useful in the art. The appropriate solvent may include, for instance, linear or branched hydrocarbons such as pentane, hexane, heptane, octane, and alkyl-substituted derivatives thereof; aliphatic cyclic hydrocarbons such as cyclopentane, cyclohexene, cycloheptane, and alkyl-substituted derivatives thereof; aromatic hydrocarbons such as benzene, naphthalene, toluene, xylene, and alkyl-substituted derivatives thereof; and hydrogenated aromatic hydrocarbons such as tetralin and decalin.

Unless otherwise noted, the term of "polymer" may also include a modified polymer whose terminus(es) is/are modified by a modifier. The modifier may include, for instance, a compound having one or more functional group(s) selected from amino, amide, alkoxysilyl, isocyanate, imino, imidazole, urea, ether, carbonyl, carboxyl, hydroxyl, nitrile, and pyridyl groups. The modifier may include, but not limited to, 3-(N,N-dimethylamino)-propyltrimethoxysilane, 3-(N,N-diethylamino)trimethoxysilane, 3-(N,N-dimethylamino)-propyltriethoxysilane, 3-(N,N-diethylaminopropyl)triethoxysilane, 3-glycidoxypropyl-trimethoxysilane, 2-(4-pyridylethyl)triethoxysilane, N-(3-triethoxysilylpropyl)-4,5-dihydroimidazole, and silicon tetrachloride.

Crosslinkers

The present composition may preferably be finalized to be a final product by crosslinking the mixture of at least two olefin polymers with a crosslinker or vulcanizer. The crosslinker or vulcanizer may include, for instance, sulfur, sulfur-containing compounds, radical crosslinking agents, and peroxides.

The radical crosslinking agent may include, but not limited to, ethylene glycol methacrylate (EGDMA), trimethylolpropane methacrylate, triallyl isocyanurate, triallyl cyanurate, diethylene glycol diacrylate, and neophenylene glycol diacrylate.

The peroxide may include, but not limited to, one or more selected from the group consisting of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethyl-hexanoyl) peroxide, dilauroyl peroxide, 1,1,3,3-tetramethyl-butylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methyl-benzoyl) peroxide, t-butylperoxy-2-ethylhexanoate, di(3-methyl-benzoyl) peroxide, benzoyl(3-methylbenzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di(t-butylperoxy)cyclohexyl)propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy)butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethyl-butyl hydroperoxide, cumene hydroperoxide, and t-butyl hydroperoxide.

The composition of the present embodiments may be prepared, for instance, by adding one or more of the crosslinkers above in the amount of 0.1 to 10 mass parts, preferably 0.2 to 8.0 mass parts, more preferably 0.5 to 6.0 mass parts with respect to 100 mass parts of the olefin polymer component. In still another embodiments of the present invention, the crosslinker may be added in another amount.

In the process for preparing the composition of the present embodiments, the crosslinker may preferably be peroxide in view of low contamination in a resulted product. More preferably, the peroxide may be, but not limited to, PERHEXA (R) 25B, PERHEXA(R) 25B-40, or PERHEXA(R) 25B-40MB (2,5-dimethyl-2,5-di(t-butylperoxy)hexane manufactured by NOF Corporation), in order to suppress malodor and residue amount.

Additional Components

The composition of the present embodiments may further include additional components as long as the component(s) severely spoil the transparency. The additional component may include, but not limited to, colorants, modifiers, finishing agents (e.g., lauric acid), antioxidants (e.g., monophenol, bisphenol, polyphenol, sulfur, phosphorus-based compounds such as Irganox 1010, Irgafos 168, and Irganox PS800 manufactured by BASF), reducing agents, oxygen scavengers, light stabilizers, antacids, pH stabilizers, surface treatment agents, heat stabilizers, colorants, fillers (e.g., talc, calcium carbonate, and carbon black), surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, and polyphosphoric acid.

The colorant may be used such that the composition has transparent or translucent coloring such as clear blue, clear red, and clear green. The colorant may include any conventional colorants used in the art, such as color pigments, extender pigments, anti-corrosive pigments, and functional pigments (e.g., phthalocyanine green, titanium, iron blue, iron oxide, lead suboxide, and zinc sulfide).

The composition of the present embodiments may include, for instance, about 0.10 to about 10.0 mass parts of the additional components, preferably about 0.20 to about 5.00 mass parts of the additional components, and more preferably about 0.25 to about 2.00 mass parts of the additional components with respect to 100 mass parts of the olefin polymer. In still another embodiments of the present invention, the additional components may be added in another amount.

Transparent Composition

The transparent composition of the present embodiments may preferably have less than 20% of haze, more preferably 15% or less of haze, more further preferably 10% or less of haze in view of enough transparency. If the haze is 20% or more, the transparency of the composition will be too low to meet the practical and aesthetic needs of the market.

The composition of the present embodiments may preferably have 35 or more of Type A Durometer hardness, more preferably from 35 to 70, more further preferably from 40 to 70, still more further preferably from 50 to 70. In the case that the present composition is incorporated to a product to be used under a severe environment, such as footwear (e.g., shoe sole) and rubber tire, the Type A Durometer hardness may preferably be around 60 to 70. The present composition may preferably have Type A Durometer hardness measured at 30 seconds which is 80% or more of Type A Durometer hardness measured at 0 second, preferably 90% or more of of Type A Durometer hardness measured at 0 second, more preferably 95% or more of of Type A Durometer hardness measured at 0 second.

In an embodiment, the present composition may preferably include at least one olefin polymer(s) having refractive index of between 1.500 to 1.525 at 23 degree C. In one aspect of the embodiment, the present composition may also include a second olefin polymer having refractive index, where the absolute value of the difference between the refractive indices of the first and second olefin polymers is 0.100 or less, preferably 0.050 or less, more preferably 0.020 or less, in view of enough transparency.

In an embodiment, the present composition may include both low-cis isoprene rubber (IR) ingredient and a rubber component selected from butadiene rubber (BR), 1,2-polybutadiene rubber, styrene butadiene rubber (SBR), acrylonitrile butadiene rubber (NBR), hydrogenated nitrile rubber (HNBR), urethane rubber (U), ethylene-propylene rubber (EPM), ethylene-propylene-diene rubber (EPDM), chloroprene rubber (CR), and natural grade rubber (NR). In one aspect of the embodiment, the amount of the low-cis isoprene rubber ingredient may be from 45 to 95 mass parts, with the proviso that the total amount of the low-cis isoprene rubber ingredient and the rubber polymer component is 100 mass parts. In another embodiment, the low-cis isoprene rubber may have 90 to 94% of cis content.

In an embodiment, the present composition may be substantially free of oil as a softener to avoid oil bleeding.

In an embodiment, the present composition may have 88% or more, preferably 90% or more, more preferably 91% or more of total luminous transmittance measured according to JIS K7361-1. If the total luminous transmittance is less than 88%, the composition will lack enough transparency.

In an embodiment, the composition may have 10 N/mm or more, preferably 10 N/mm to 50 N/mm, more preferably 10 N/mm to 40 N/mm of tear strength measured by 2 mm-thick sheet (and converted in N/mm unit) according to JIS K6252. If the tear strength is less than 10 N/mm, the composition may lack durability.

Manufacturing Procedure

In an embodiment, the composition may prepared by the process comprising the acts of: providing a first olefin polymer prepared by a lithium catalyst, the first olefin polymer having refractive index of between 1.500 to 1.525 at 23 degree C.; providing a second olefin polymer prepared by a lithium catalyst, the second olefin polymer being different from the first olefin polymer; mixing the first and second olefin polymers to obtain a mixture thereof; adding a crosslinker to the mixture; and uniformly kneading the mixture.

Using a lithium catalyst is preferred since it leads to little residue and may contribute to high transparency of the resulted composition. The lithium catalyst may be organic lithium catalysts. The organic lithium catalysts may be a mono-, bis-, tris-, or tetrakis-substituted lithium compound with C1 to C20 hydrocarbyl group(s) or preferably with C2 to C8 hydrocarbyl group(s).

The organic lithium catalyst may include, but not limited to, alkyl lithium such as methyl lithium, ethyl lithium, propyl lithium, n-butyl lithium, s-butyl lithium, and t-butyl lithium; aryl lithium such as phenyl lithium and tolyl lithium; alkenyl lithium such as vinyl lithium and propenyl lithium; and alkylene lithium such as tetramethylene lithium and pentamethylene lithium.

The composition of the present embodiments may be used in any industrial fields that can utilize its high transparency. The industrial use may include, but not limited to, footwear products, tires, clothes, mask, rain gear, toys, damping materials, building components, coating material for wiring, packaging materials, protection members for computers, computer peripherals, contraceptive devices, sex toys, artificial nipple, disposable diapers, stationery, containers, food trays, balls for sports, ball chairs, and protective films.

The composition of the present embodiments may be used to manufacture footwear products such as shoe sole, tip, ornament, tongue and other parts having high transparency and strength that cannot be produced by the conventional technique. The present composition may also be used to prepare a shoe which is all transparent. The footwear above can have both practicability and aesthetic design, and will be commercially worthwhile. Like the other use, being substantially free of oil can avoid the issue of oil bleeding and damages on other parts. It is greatly advantageous in the art.

The composition of the present embodiments may be used to prepare an esthetical rubber tire which has strength and transparency. For instance, the tire may be a stylish one for bikes or automobiles. A rubber tube may also be manufactured in a similar manner.

The composition of the present embodiments may also be used for manufacturing clothes and underclothes, rain gears, masks such as a mask for medical purpose and a mask for preventing hay fever, or eyewear such as protective glasses for welding, goggles for cycling or swimming, and protective eyewear for chemical experiments such that the products can have a highly tough and transparent portion(s) therein. The products can be practically useful to see through them, and can both have aesthetic design and long lifetime.

The composition of the present embodiments may also be used for preparing a damping or building material having excellent aesthetic transparency as well as exerting high durability or damping properties.

The composition of the present embodiments may also be used for preparing a coating material for wiring or a packaging material such that one can easily see the interior through the material having high insulation quality.

The composition of the present embodiments may also be used for manufacturing toys such as a plastic model, small scale production model kit, and die-cast toy car, artificial nipple, or disposable diapers. The product may be at least partially transparent, and safe even if an infant puts it in his mouth.

The composition of the present embodiments may also be used instead of silicone resin for manufacturing contraceptive devices (e.g., condom and pessary), sex toys (e.g., life-size doll and dildo), protective members for computers (e.g., a jacket for a smart phone), computer peripherals (e.g., keyboard and mice), containers, food trays, balls for sports, and ball chairs. The products may be partially or wholly transparent to meet design requirements, and still have an equivalent usability to the conventional one. The products can prohibit the issue of oil bleeding, and be safe in health care even if the product touches a human body, and have good durability.

Note that the aforementioned applications are mere examples of the present embodiments, the present embodiments shall not be limit to those applications.

EXAMPLES

Embodiments of the present invention will now be further illustrated with reference to the following examples, however, without restricting its scope to these embodiments.

Example 1

1st Step: A bulk (95 g) of low-cis polyisoprene rubber (Cariflex IR0307KU manufactured by Kraton Polymers) was pressed by a 5-inch open roller (manufactured by Yasuda Seiki, roller temperature: 70 degree C., rotation speed ratio: 1:1.25).

2nd Step: The temperature of the roller was increased to 100 degree C. 5.0 g of 1,2-polybutadiene (RB-820 manufactured by JSR) was hung on the roller, and then pressed and wrapped onto the roller.

3rd Step: The pressed polyisoprene rubber (resulted from Step 1) and 0.25 g of lauric acid was simultaneously added to the roller wrapped with the 1,2-polybutadiene, and then the materials were uniformly kneaded.

4th Step: The uniformly-kneaded rubber was removed from the roller, and then the temperature of the roller was cooled down to 70 degree C.

5th Step: The rubber removed at Step 4 was wrapped again onto the roller at 70 degree C. Then 2.0 g of 2,5-dimethyl-2, 5-di(t-butylperoxy)hexane (PERHEXA(R) 25B manufactured by NOF Corporation) and 4.0 g of ethylene glycol dimethacrylate (EGDMA) were added to the rubber. The mixture was uniformly kneaded.

6th Step: The kneaded rubber was cut off from the roller to a sheet having 3 mm to 4 mm thickness. The sheet was aged at room temperature for one day and night.

7th Step: The aged rubber was cured or vulcanized by a 36-ton two-stage heating and cooling press machine (manufactured by KANSAI ROLL Co., Ltd.) at the temperature of 150 degree C. and the pressure of 15 MPa for 13 minutes to obtain Example 1 of rubber composition. Example 1 was also subjected under the test procedures above to measure the physical and chemical properties.

Additional Note: In Step 4, removing the rubber from the roller aimed to avoid three issues shown below.

At first, if the rubber is left on the roller, the cooling period will be too much to knead the rubber, and then too much molecular chains of the rubber will be cut and the properties will be deteriorated.

Secondly, if the roller is stopped with leaving the rubber on it, re-starting the roller will be disturbed by the cooled rubber having higher viscosity, and then too much force may be dangerously applied to the roller.

Lastly, if the roller is still wrapped with the rubber at the cooling step, the rubber works as a thermal insulator and will take a long time for cooling down.

Example 2

The rubber composition of Example 2 was prepared by the same process as Example 1 except for using 80 g of Cariflex IR0307KU at Step 1, using 20 g of RB-820 at Step 2, and that the vulcanization period was 7 minutes at Step 7.

Example 3

The rubber composition of Example 3 was prepared by the same process as Example 1 except for using 90 g of Cariflex IR0307KU at Step 1, using 10 g of RB-820 at Step 2, using 0.5 g of lauric acid at Step 3, and that the vulcanization temperature was 160 degree C. and the vulcanization period was 10 minutes at Step 7.

Example 4

The rubber composition of Example 4 was prepared by the same process as Example 1 except for using 50 g of Cariflex IR0307KU at Step 1, using 50 g of RB-820 at Step 2, using 1.0 g of PERHEXA 25B without EGDMA at Step 5, and that the vulcanization temperature was 160 degree C. and the vulcanization period was 5 minutes at Step 7.

Example 5

The rubber composition of Example 5 was prepared by the same process as Example 1 except for using 50 g of Cariflex IR0307KU at Step 1, using 50 g of Diene 35NR (manufactured by Firestone Polymers) instead of RB-820 at Step 2, using 1.0 g of PERHEXA 25B without EGDMA at Step 5, and that the vulcanization temperature was 160 degree C. and the vulcanization period was 10 minutes at Step 7.

Example 6

The rubber composition of Example 6 was prepared by the same process as Example 1 except for using 50 g of Cariflex IR0307KU at Step 1, using 50 g of RB-820 at Step 2, using 1.5 g of PERHEXA 25B without EGDMA at Step 5, and that the vulcanization temperature was 160 degree C. and the vulcanization period was 6 minutes at Step 7.

Example 7

The rubber composition of Example 7 was prepared by the same process as Example 1 except for using 50 g of Cariflex IR0307KU at Step 1, using 50 g of RB-820 at Step 2, using 2.0 g of PERHEXA 25B without EGDMA at Step 5, and that the vulcanization temperature was 160 degree C. and the vulcanization period was 6 minutes at Step 7.

Example 8

The rubber composition of Example 8 was prepared by the same process as Example 1 except for using 50 g of Cariflex IR0307KU at Step 1, using 50 g of RB-820 at Step 2, using 1.0 g of PERHEXA 25B and 2.0 g of EGDMA at Step 5, and that the vulcanization period was 5 minutes at Step 7.

Example 9

The rubber composition of Example 9 was prepared by the same process as Example 1 except for using 50 g of Cariflex IR0307KU at Step 1, using 50 g of RB-820 at Step 2, using 1.0 g of PERHEXA 25B at Step 5, and that the vulcanization period was 4 minutes at Step 7.

Example 10

The rubber composition of Example 10 was prepared by the same process as Example 1 except for using 60 g of Cariflex IR0307KU at Step 1, using 40 g of RB-820 at Step 2, using 1.0 g of PERHEXA 25B without EGDMA at Step 5, and that the vulcanization temperature was 160 degree C. and the vulcanization period was 7 minutes at Step 7.

Example 11

The rubber composition of Example 11 was prepared by the same process as Example 1 except for using 70 g of Cariflex IR0307KU at Step 1, using 30 g of RB-820 at Step 2, using 1.0 g of PERHEXA 25B without EGDMA at Step 5, and that the vulcanization temperature was 160 degree C. and the vulcanization period was 11 minutes at Step 7.

Example 12

The rubber composition of Example 12 was prepared by the same process as Example 1 except for using 70 g of Cariflex IR0307KU at Step 1, using 30 g of RB-820 at Step 2, using no EGDMA at Step 5, and that the vulcanization temperature was 160 degree C. and the vulcanization period was 6 minutes at Step 7.

Example 13

The rubber composition of Example 13 was prepared by the same process as Example 1 except for using 70 g of Cariflex IR0307KU at Step 1, using 30 g of RB-820 at Step 2, using 1.0 g of PERHEXA 25B at Step 5, and that the vulcanization period was 6 minutes at Step 7.

Example 14

The rubber composition of Example 14 was prepared by the same process as Example 1 except for using 70 g of Cariflex IR0307KU at Step 1, using 30 g of RB-820 at Step 2, and that the vulcanization period was 6 minutes at Step 7.

Comparative Example c1

Step c1: A bulk (100 g) of low-cis polyisoprene rubber (Cariflex IR0307KU manufactured by Kraton Polymers) was pressed by a 5-inch open roller (manufactured by Yasuda Seiki, roller temperature: 55 degree C., rotation speed ratio: 1:1.25).

Step c2: The spread rubber was added 0.5 g of lauric acid.

Step c3: The polyisoprene rubber was then added 2.0 g of 2,5-dimethyl-2,5-di(t-butylperoxy)hexane (PERHEXA(R) 25B manufactured by NOF Corporation) and 4.0 g of EGDMA. The mixture was uniformly kneaded.

Step c4: The kneaded rubber was cut off from the roller to a sheet having 3 mm to 4 mm thickness. The sheet was aged at room temperature for one day and night.

Step c5: The aged rubber was cured or vulcanized by a 36-ton two-stage heating and cooling press machine (manufactured by KANSAI ROLL Co., Ltd.) at the temperature of 160 degree C. and the pressure of 15 MPa for 15 minutes to obtain comparative example c1 of rubber composition. Comparative example c1 was also subjected under the same test procedures as Example 1 to measure the physical and chemical properties.

Comparative Example c2

The rubber composition of comparative example c2 was prepared by the same process as comparative example c1 except for omitting Step c2, and using no EGDMA at Step c3.

Comparative Example c3

The rubber composition of comparative example c3 was prepared by the same process as comparative example c1 except for further adding 1.0 g of Irganox 1010, and using no EGDMA at Step c3.

Comparative Example c4

The rubber composition of comparative example c4 was prepared by the same process as Example 1 except for using 50 g of natural rubber (NR#1; Ribbed Smoked Sheet #1 made in Thailand) instead of Cariflex IR0307KU at Step 1, using 50 g of RB-820 at Step 2, using 1.0 g of PERHEXA 25B at Step 5, and that the vulcanization temperature was 160 degree C. and the vulcanization period was 7 minutes at Step 7.

Comparative Example c5

The rubber composition of comparative example c5 was prepared by the same process as comparative example c1 except for using 100 g of high-cis isoprene rubber (IR 2200GA manufactured by ZEON) instead of Cariflex IR0307KU at Step c1, omitting Step c2, and using no EGDMA at Step c3.

The results of Examples 1 to 14 and comparative examples c1 to c5 are shown in the table below. The working Examples exerted the combination of excellent properties such as haze and Type A Durometer Hardness. In contrast, the comparative examples had defects in some properties.

TABLE 2

| Ingredients | EXAMPLE # | | | | |
| --- | --- | --- | --- | --- | --- |
| | C1 | C2 | C3 | C4 | C5 |
| IR-307 | 100 | 100 | 100 | | |
| 2200GA | | | | | 100 |
| NR#1 | | | | 50 | |
| RB-820 | | | | 50 | |
| Diene-35NR | | | | | |
| Lauric Acid | 0.5 | | | 0.5 | 0.25 |
| Irganox 1010 | | | 1 | | 0.5 |
| Perhexa 25B | 2 | 2 | 2 | 1 | 2 |
| EGDMA | 4 | | | | |
| Total | 106.5 | 102.0 | 103.5 | 101.3 | 102.5 |
| Cure Temp (° C.) | 160 | 160 | 160 | 160 | 160 |
| Cure Time (min) | 15 | 15 | 15 | 7 | 15 |
| Hs, A 0 sec | 35 | 33 | 31 | 61 | 30 |
| HS, A 30 sec | 35 | 33 | 31 | 58 | 30 |
| Haze (%) | 13 | 9 | 6 | 44 | 73 |
| TT (%) | 92 | 91 | 91 | 50 | 82 |
| Tear Strength (N/2 mm) | 18.9 | 33.6 | 42.1 | 59.5 | 36.3 |
| @Tear strength (N/mm) | 9 | 17 | 21 | 30 | 18 |

In order to compare Taber and DIN abrasion resistances of the present and comparative compositions, further examples were carried out as follows.

Example 15

The rubber composition of Example 15 was prepared by the same process as Example 1 except for using 50 g of Cariflex IR0307KU at Step 1, using 50 g of RB-820 at Step 2, using 1.0 g of PERHEXA 25B without EGDMA at Step 5, and that the vulcanization temperature was 160 degree C. and the vulcanization period was 7 minutes at Step 7. Taber abrasion resistance was measured according to JIS K7204 (or ASTM D1044), and DIN abrasion resistance was measured according to JIS K6264-2.

Example 16

The rubber composition of Example 16 was prepared by the same process as Example 15 except for further adding 2.0 g of EGDMA at Step 5, and that the vulcanization tempera-

TABLE 1

| Ingredients | Example # | | | | | | | | | | | | | |
| --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 |
| IR-307 | 85 | 80 | 90 | 50 | 50 | 50 | 50 | 50 | 50 | 60 | 70 | 70 | 70 | 70 |
| 2200GA | | | | | | | | | | | | | | |
| NR#1 | | | | | | | | | | | | | | |
| RB-820 | 5 | 20 | 10 | 50 | | 50 | 50 | 50 | 50 | 40 | 30 | 30 | 30 | 30 |
| Diene-35NR | | | | | 50 | | | | | | | | | |
| Lauric Acid | 0.25 | 0.25 | 0.5 | 0.25 | 0.25 | 0.25 | 0.25 | 0.25 | 0.25 | 0.25 | 0.25 | 0.25 | 0.25 | 0.25 |
| Perhexa 25B | 2 | 2 | 2 | 1 | 1 | 1.5 | 2 | 1 | 1 | 1 | 1 | 2 | 1 | 2 |
| EGDMA | 4 | 4 | 4 | | | | | 2 | 4 | | | | 4 | 4 |
| Total | 106.3 | 106.3 | 106.5 | 101.3 | 101.3 | 101.8 | 102.3 | 103.3 | 105.3 | 101.3 | 101.3 | 102.3 | 105.3 | 106.3 |
| Cure Temp (° C.) | 150 | 150 | 160 | 160 | 160 | 160 | 160 | 150 | 150 | 160 | 160 | 160 | 150 | 150 |
| Cure Time (min) | 13 | 7 | 10 | 5 | 10 | 6 | 6 | 5 | 4 | 7 | 11 | 6 | 6 | 6 |
| HS,A 0 sec | 35 | 44 | 39 | 59 | 37 | 58 | 60 | 63 | 65 | 54 | 44 | 45 | 47 | 50 |
| HS,A 30 sec | 35 | 42 | 39 | 56 | 35 | 55 | 56 | 58 | 60 | 51 | 42 | 42 | 44 | 46 |
| Haze (%) | 5 | 5 | 16 | 9 | 9 | 9 | 15 | 5 | 6 | 4 | 9 | 8 | 9 | 9 |
| TT (%) | 91 | 91 | 92 | 91 | 91 | 91 | 92 | 91 | 91 | 91 | 91 | 91 | 91 | 91 |
| Tear Strength (N/2 mm) | 34.5 | 38.9 | 22.0 | 58.3 | 14.6 | 46 | 34.7 | 58.3 | 61.4 | 36 | 22.9 | 38 | 43.4 | 41.6 |
| @ Tear Strength (N/mm) | 17 | 19 | 11 | 29 | 7 | 23 | 17 | 29 | 31 | 18 | 11 | 19 | 22 | 21 | ture was 150 degree C. and the vulcanization period was 6 minutes at Step 7. (Some measurements e.g. for haze were omitted.)

Example 17

The rubber composition of Example 17 was prepared by the same process as Example 15 except for further adding 4.0 g of EGDMA at Step 5, and that the vulcanization period was 6 minutes at Step 7. (Some measurements e.g. for haze were omitted.)

Example 18

The rubber composition of Example 18 was prepared by the same process as Example 15 except that the vulcanization period was 6 minutes at Step 7.

Comparative Example c6

The rubber composition of comparative example c6 was prepared by the same process as comparative example c1 except for omitting Step c2, and using no EGDMA at Step c3. (Some measurements e.g. for haze were omitted.)

Comparative Example c7

The rubber composition of comparative example c7 was prepared by the same process as Example 1 except for using 50 g of high-cis isoprene rubber (IR 2200GA manufactured by ZEON) instead of Cariflex IR0307KU at Step 1, using 50 g of RB-820 at Step 2, using 1.0 g of PERHEXA 25B without EGDMA at Step 5, and that the vulcanization temperature was 160 degree C. and the vulcanization period was 7 minutes at Step 7.

The results of Examples 15 to 18 and comparative examples c6 and c7 are shown in the table below. The results demonstrate that the present working examples exerted the advantageous combination of properties including abrasive resistance, while the comparative examples had defects on some properties.

TABLE 3

| Ingredients | Example # | | | | | |
|---|---|---|---|---|---|---|
| | 15 | 16 | 17 | 18 | C6 | C7 |
| IR-307 | 50 | 50 | 50 | 50 | 100 | |
| 2200GA | | | | | | 50 |
| NR#1 | | | | | | |
| RB-80 | 50 | 50 | 50 | 50 | | 50 |
| Diene-35NR | | | | | | |
| Lauric Acid | 0.25 | 0.25 | 0.25 | 0.25 | | 0.25 |
| Irganox 1010 | | | | | | |
| Perhexa 25B | 1 | 1 | 1 | 1 | 2 | 1 |
| EGDMA | | 2 | 4 | | | |
| Total | 101.3 | 103.3 | 105.3 | 101.3 | 102.0 | 101.3 |
| Cure Temp (°) | 160 | 150 | 150 | 160 | 160 | 160 |
| Cure Time (min) | 7 | 6 | 6 | 6 | 15 | 7 |
| Hs,A 0 sec | 60 | — | — | 61 | — | 60 |
| HS,A 30 sec | 56 | — | — | 57 | — | 57 |
| Haze (%) | 6 | — | — | 6 | — | 51 |
| TT (%) | 91 | — | — | 91 | — | 87 |
| Tear Strength (N/2 mm) | 42.7 | — | — | 41.7 | — | 59.2 |
| @ Tear Strength (N/mm) | 21 | — | — | 21 | — | 30 |

TABLE 3-continued

| Ingredients | Example # | | | | | |
|---|---|---|---|---|---|---|
| | 15 | 16 | 17 | 18 | C6 | C7 |
| Taber abrasion (mg) | <10 | <10 | <10 | — | 3919 | <10 |
| DIN abrasion (mg) | 335 | 223 | 178 | 306 | 657 | 286 |

The invention claimed is:

1. A transparent, crosslinked rubber composition, comprising:
   low-cis isoprene rubber (IR); and
   a rubber polymer component selected from the group consisting of butadiene rubber (BR), 1,2-polybutadiene rubber, styrene butadiene rubber (SBR), acrylonitrile butadiene rubber (NBR), hydrogenated nitrile rubber (HNBR), urethane rubber (U), ethylene-propylene rubber (EPM), ethylene-propylene-diene rubber (EPDM), and natural rubber (NR),
   wherein the amount of the low-cis isoprene rubber is from 45 to 95 mass parts, with the proviso that the total amount of the low-cis isoprene rubber and the rubber polymer component is 100 mass parts,
   wherein the composition is substantially free of silica, and
   wherein the low-cis isoprene rubber has a Mooney viscosity of from about 35 to about 55.

2. The composition according to claim 1, wherein the cis content of the low-cis isoprene rubber is from 90 to 94%.

3. A crosslinked rubber composition, being substantially free of silica, comprising:
   a first olefin polymer having refractive index of between 1.500 to 1.525 at 23 degree C.; and
   a second olefin polymer which is different from the first olefin polymer,
   wherein the first olefin polymer, the second olefin polymer, or both have a Mooney viscosity of from about 35 to about 55,
   wherein the composition has haze of 20% or less on 2 mm thick sheet, measured according to JIS K7136, and
   wherein the composition has Type A Durometer hardness (0 sec) of 35 or more, measured according to JIS K6253.

4. The composition according to claim 3, wherein the absolute value of the difference between the refractive indices of the first and second olefin polymer is 0.100 or less.

5. The composition according to claim 1, wherein the composition is substantially free of oil as a softener.

6. The composition according to claim 1, wherein the composition has Type A Durometer hardness (30 sec) of 35 or more, measured according to JIS K6253.

7. The composition according to claim 1, wherein the composition has Tear Strength of 10 N/mm or more, measured on a 2-min sheet according to JIS K6252.

8. The composition according to claim 1, wherein the composition has Total Light Transmittance of 88% or more, measured according to HS K7361-1.

9. The composition according to claim 3, wherein the composition is substantially free of oil as a softener.

10. The composition according to claim 3, wherein the composition has Type A Durometer hardness (30 sec) of 35 or more, measured according to JIS K6253.

11. The composition according to claim 3, wherein the composition has Tear Strength of 10 N/mm or more measured on, a 2-mm sheet according to JIS K6252.

12. The composition according to claim 3, wherein the composition has Total Light Transmittance of 88% or more, measured according to JIS K7361-1.

13. A process for manufacturing a transparent, crosslinked rubber composition, being substantially free of silica, the process comprising the acts of:
provided a first olefin polymer prepared by a lithium catalyst, the first olefin polymer having refractive index of between 1.500 to 1.525 at 23 degree C.;
providing a second olefin polymer prepared by a lithium catalyst, the second olefin polymer being different from the first olefin polymer, wherein the first olefin polymer, the second olefin polymer, or both have a Mooney viscosity of from about 35 to about 55;
mixing the first and second olefin polymers to obtain a mixture thereof;
adding a crosslinker to the mixture; and
uniformly kneading the mixture.

14. The process according to claim 13, wherein the crosslinker is peroxide.

15. An article comprising the composition according to claim 1.

16. The article according to claim 15, wherein the article is selected from the group consisting of footwear, tires, clothes, rain gears, eyewear, masks, toys, damping materials, building materials, coatings for wiring, packaging materials, protective members for computers, computer peripherals, contraceptive devices, sex toys, artificial nipples, paper diapers, stationery, containers, food trays, balls for sports, ball chairs, and protection films.

17. An article comprising the composition according to claim 3.

18. The article according to claim 17, wherein the article is selected from the group consisting of footwear, tires, clothes, rain gears, eyewear, masks, toys, damping materials, building materials, coatings for wiring, packaging materials, protective members for computers, computer peripherals, contraceptive devices, sex toys, artificial nipples, paper diapers, stationery, containers, food trays, balls for sports, ball chairs, and protection films.

19. The composition according to claim 1, wherein the rubber polymer component is a 1,2-polybutadiene rubber having a ratio of 1,2-addition greater than 30%.

20. The composition according to claim 1, further comprising an antioxidant.

* * * * *